No. 855,467. PATENTED JUNE 4, 1907.
F. MEISEL.
LUBRICATING DEVICE.
APPLICATION FILED SEPT. 29, 1903.

Witnesses:
C. F. Wesson.
M. E. Regan.

Inventor:
F. Meisel.
By his Attorneys,
Southgate & Southgate

UNITED STATES PATENT OFFICE.

FRANCIS MEISEL, OF DORCHESTER, MASSACHUSETTS.

LUBRICATING DEVICE.

No. 855,467.  Specification of Letters Patent.  Patented June 4, 1907.

Application filed September 29, 1903. Serial No. 175,067.

*To all whom it may concern:*

Be it known that I, FRANCIS MEISEL, a citizen of the United States, residing at Dorchester, in the county of Suffolk and State of Massachusetts, have invented a new and useful Lubricating Device, of which the following is a specification.

This invention relates to an improved construction for holding a rotatable part or wheel in place on its bearings, and for supplying lubricating oil to said bearings.

The especial object of this invention is to provide an end-piece or plate of simple, strong and inexpensive construction, which replaces the ordinary stud-nuts or collars, and which also serves as an oil reservoir or chamber.

To these ends, this invention consists of the lubricating device and of the combinations of parts therewith as hereinafter described and more particularly pointed out in the claims at the end of this specification.

Figure 1:
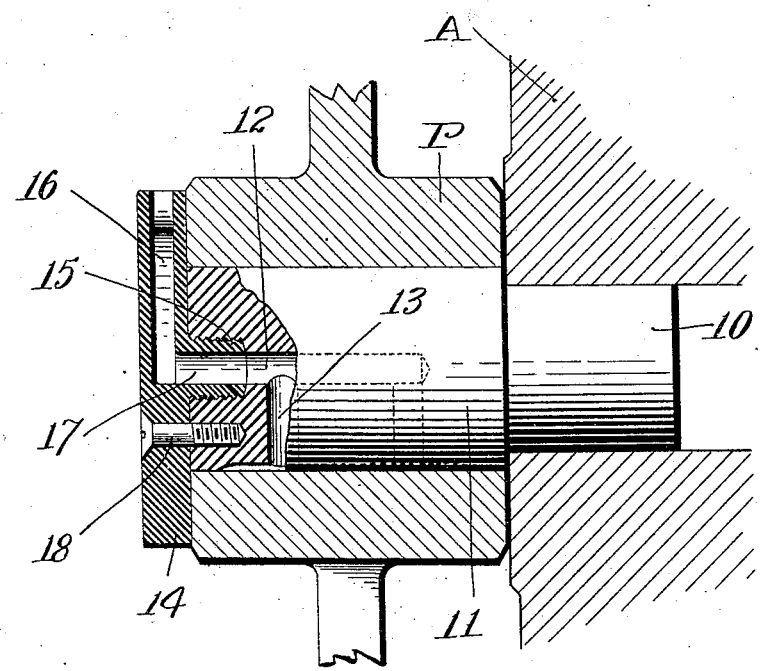
Figure 2:
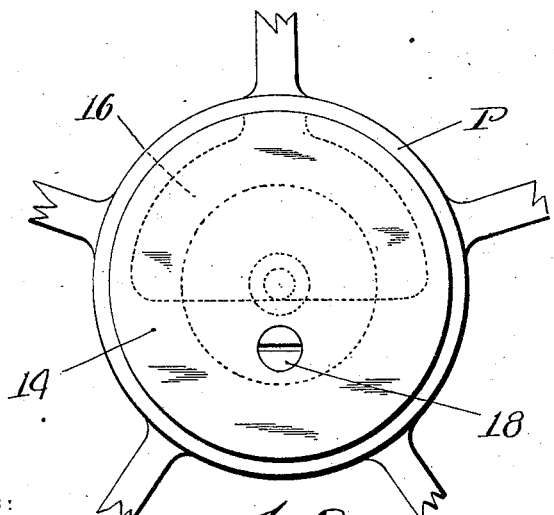

In the accompanying drawings, Figure 1 is a sectional view of sufficient parts of a machine frame and pulley to illustrate the application of my invention thereto, and Fig. 2 is an end view of the parts shown in Fig. 1.

In ordinary machine construction most of the bearings are intended to be lubricated through ordinary oil holes. These oil holes are often located in comparatively inaccessible situations, so that unless care and constant supervision are exercised the bearings are liable to become heated and to grind. To overcome this objection different oil supplying systems have been provided which are intended to furnish a continuous supply of oil to the bearings, for example, by the use of oil pumps or by the use of oil cups or reservoirs.

The especial object of my present invention is to provide an oil reservoir construction which may be applied to a bearing at equally small expense, as the ordinary unlubricated bearing. To this end, I have provided a cap or plate which is hollow and serves the double purpose of an end-stop or plate, and of an oil reservoir.

Referring to the accompanying drawing and in detail, A designates part of a machine frame or other stationary part. Driven into the frame A is the reduced section 10 of a stud having an enlarged bearing section 11. Bored into the stud is a central longitudinal oil channel 12 and transverse oil channels 13 for supplying oil to a bottom groove in the usual manner. Mounted on the stud and turning thereon is the hub of a pulley or other wheel P. The end plate 14 which holds the pulley in place is provided with a threaded extension 15, and is cored or otherwise chambered out to form an oil reservoir 16. Bored through the threaded extension 15 is an oil channel 17 which connects with the oil channel 12. The end-plate is locked in place and prevented from turning by a screw 18.

In the use of a bearing as thus constructed, the end-plate 14 replaces the ordinary cotter-pin and collar, or nut and collar now ordinarily used for holding a rotating part on its stud, while, at the same time, the chamber 16 provides an oil reservoir of sufficient capacity to keep the bearing well lubricated for long periods without attention.

In the drawing of this application for patent I have shown my invention applied to an ordinary machine stud which is stationary, and is secured in position by being driven into the framework. It is obvious, however, that the lubricating device of my invention may be applied in many different situations. For example, it may be used in carriage-axles, or other similar stationary axles, or may even be applied to parts which are rotary or movable.

I am aware that numerous changes may be made in practicing my invention by those who are skilled in the art without departing from the scope thereof as expressed in the claims. I do not wish, therefore, to be limited to the construction I have herein shown and described, but What I do claim and desire to secure by Letters Patent of the United States is:—

1. The combination of a support, a stud projecting from the support, a wheel journaled upon the stud, a retaining plate for holding the wheel in place, said retaining plate having a threaded part screwed into the end of the stud, and said retaining plate having an oil chamber connected by an oil channel extending through the threaded part to oil channels in the stud, and means for holding said retaining plate from loosening.

2. The combination of a support, a stud extending from said support, a wheel journaled on the stud, an end-plate for holding the wheel in place, said end plate having a projection threaded into the end of the stud with an oil chamber in the upper part of said plate connected by an oil passage extending through the threaded projection to an oil passage in the stud from which channels extend down to the wheel bearing.

In testimony whereof I have hereunto set my hand, in the presence of two subscribing witnesses.

FRANCIS MEISEL.

Witnesses:
CHARLES P. SHATTUCK,
LOUISE HAND.